United States Patent
Acks et al.

(10) Patent No.: US 10,479,487 B2
(45) Date of Patent: Nov. 19, 2019

(54) LANDING GEAR FOLDING BRACE WITH LOCKING ACTUATOR

(71) Applicant: Goodrich Corporation, Charlotte, NC (US)

(72) Inventors: James Acks, Medina, OH (US); Korey Michael Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 368 days.

(21) Appl. No.: 15/409,070

(22) Filed: Jan. 18, 2017

(65) Prior Publication Data

US 2018/0201365 A1 Jul. 19, 2018

(51) Int. Cl.
| | |
|---|---|
| *B64C 25/22* | (2006.01) |
| *B64C 25/26* | (2006.01) |
| *B64C 25/34* | (2006.01) |
| *B64C 25/10* | (2006.01) |
| *B64C 25/12* | (2006.01) |

(52) U.S. Cl.
CPC .............. *B64C 25/22* (2013.01); *B64C 25/10* (2013.01); *B64C 25/12* (2013.01); *B64C 25/26* (2013.01); *B64C 25/34* (2013.01)

(58) Field of Classification Search
CPC ......... B64C 25/22; B64C 25/10; B64C 25/12; B64C 25/26; B64C 25/34
See application file for complete search history.

(56) References Cited

U.S. PATENT DOCUMENTS

| | | | | |
|---|---|---|---|---|
| 2,422,576 A | * | 6/1947 | Martin | B64C 25/26 244/102 SL |
| 4,408,646 A | * | 10/1983 | Forsyth | B60C 27/20 152/179 |
| 4,556,179 A | * | 12/1985 | Veaux | B64C 25/22 244/102 A |
| 5,333,816 A | * | 8/1994 | Del Monte | B64C 25/50 244/50 |
| 8,390,479 B2 | * | 3/2013 | Wilby | B64C 25/26 244/100 R |
| 2008/0191090 A1 | * | 8/2008 | Chow | B64C 25/12 244/102 R |

(Continued)

FOREIGN PATENT DOCUMENTS

| | | | | |
|---|---|---|---|---|
| EP | 2769914 | | 8/2014 | |
| EP | 2769914 A2 | * | 8/2014 | B64C 25/50 |

(Continued)

OTHER PUBLICATIONS

European Patent Office, European Search Report dated Mar. 27, 2018 in Application No. 18151901.8-1010.

(Continued)

*Primary Examiner* — Justin M Benedik
(74) *Attorney, Agent, or Firm* — Snell & Wilmer, L.L.P.

(57) ABSTRACT

A locking actuator arrangement may comprise an actuator housing defining a retaining cavity, an actuator piston comprising a piston head and a piston rod extending from the piston head, a receptacle body defining a receiving cavity, wherein the receiving cavity is configured to receive at least a portion of the piston rod, and the piston rod is configured to be received by the receiving cavity in response to alignment of at least two coupled links.

18 Claims, 7 Drawing Sheets

(56) References Cited

U.S. PATENT DOCUMENTS

| | | | | |
|---|---|---|---|---|
| 2009/0101754 A1* | 4/2009 | O'Connell | ............. | B64C 25/50 |
| | | | | 244/102 SL |
| 2012/0132742 A1* | 5/2012 | O'Connell | ............. | B64C 25/50 |
| | | | | 244/100 R |
| 2016/0137295 A1* | 5/2016 | Bond | ..................... | B64C 25/24 |
| | | | | 244/102 A |

FOREIGN PATENT DOCUMENTS

| | | | |
|---|---|---|---|
| GB | 454279 | * | 9/1936 |
| GB | 639811 | * | 7/1950 |
| GB | 644147 | | 10/1950 |
| GB | 648362 | * | 1/1951 |

OTHER PUBLICATIONS

European Patent Office, European Office Action dated Apr. 3, 2019 in Application No. 18151901.8.

* cited by examiner

LANDING GEAR FOLDING BRACE WITH LOCKING ACTUATOR

FIELD

The present disclosure relates generally to landing gear for aircraft and more specifically to a retractable landing gear.

BACKGROUND

The landing gear on various air vehicles hangs into the wind stream, causing drag that tends to reduce top speed and range. Typically, a landing gear includes a shock strut and a folding brace. A folding brace may lock a landing gear in a deployed position.

SUMMARY

A locking actuator arrangement is disclosed herein, in accordance with various embodiments. A locking actuator arrangement may comprise an actuator housing defining a retaining cavity, an actuator piston comprising a piston head and a piston rod extending from the piston head, a receptacle body defining a receiving cavity, wherein the receiving cavity is configured to receive at least a portion of the piston rod, and the piston rod is configured to be received by the receiving cavity in response to a pre-determined alignment of at least two coupled links.

In various embodiments, the locking actuator arrangement may further comprise a spring configured to be disposed in the retaining cavity, wherein the spring is configured to bias the actuator piston to extend from the retaining cavity. The actuator housing may be configured to be coupled to a housing link of the coupled links. The receptacle body may be configured to be coupled to a receiving link of the coupled links. The piston head may be configured to separate the retaining cavity into a first chamber and a second chamber. The locking actuator arrangement may further comprise a port in fluid communication with the retaining cavity configured to supply a hydraulic pressure to at least one of retract and extend the actuator piston relative to the actuator housing. The spring may be housed within the first chamber. The locking actuator arrangement may further comprise a first stopping feature disposed on the housing link and a second stopping feature disposed on the receiving link, wherein the first stopping feature is configured to engage the second stopping feature to prevent over rotation of at least one of the housing link and the receiving link. The locking actuator arrangement may further comprise a cam feature disposed on the receiving link configured to make sliding contact with the piston rod.

A landing gear arrangement is disclosed herein, in accordance with various embodiments. A landing gear arrangement may comprise a housing link, a receiving link pivotally coupled to the housing link, an actuator housing coupled to the housing link and defining a retaining cavity, and an actuator piston comprising a piston head and a piston rod extending from the piston head, wherein the receiving link defines a receiving cavity, and the piston rod is configured to be received by the receiving cavity in response to the landing gear arrangement being deployed.

In various embodiments, the landing gear arrangement may further comprise a spring configured to bias the actuator piston to extend from the retaining cavity. The actuator housing may extend from the housing link. The landing gear arrangement may further comprise a pivot, wherein the housing link is pivotally coupled to the receiving link via the pivot. The piston head may be configured to separate the retaining cavity into a first chamber and a second chamber. The landing gear arrangement may further comprise a port in fluid communication with the retaining cavity configured to supply a hydraulic pressure to at least one of retract and extend the actuator piston relative to the actuator housing. The spring may be housed within the first chamber. The landing gear arrangement may further comprise a first stopping feature disposed on the housing link, and a second stopping feature disposed on the receiving link, wherein the first stopping feature is configured to engage the second stopping feature to prevent over rotation of at least one of the housing link and the receiving link. The landing gear arrangement may further comprise a cam feature disposed on the receiving link configured to make sliding contact with the piston rod.

A method for locking a brace for a landing gear is disclosed herein, in accordance with various embodiments. A method for locking a brace for a landing gear may comprise
biasing an actuator piston to extend from an actuator housing coupled to a housing link, receiving, by a receiving cavity, the actuator piston, engaging, by the actuator piston, the receiving cavity, and preventing, by the actuator piston, the housing link from rotating relative to a receiving link, in response to the engaging.

In various embodiments, the method may further comprise rotating the housing link relative to the receiving link, and biasing, by a spring, the actuator piston.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Actuator arrangements of the present disclosure may comprise an actuator housing which retains an actuator piston configured to extend into a locked position and retract to an unlocked position. Actuator arrangements of the present disclosure may provide weight savings to landing gear. Actuator arrangements of the present disclosure may eliminate the need for lock links and over-center rigging for landing gear. Actuator arrangements of the present disclosure may provide reduced part count of landing gear. The exemplary actuator arrangements, as provided herein, may also be applicable to other aerospace or non-aerospace applications to lock/unlock any folding structure, such as proximate to the location or joint pivot of two coupled links to allow rotation of one link with respect to the other.

Figure 1A:
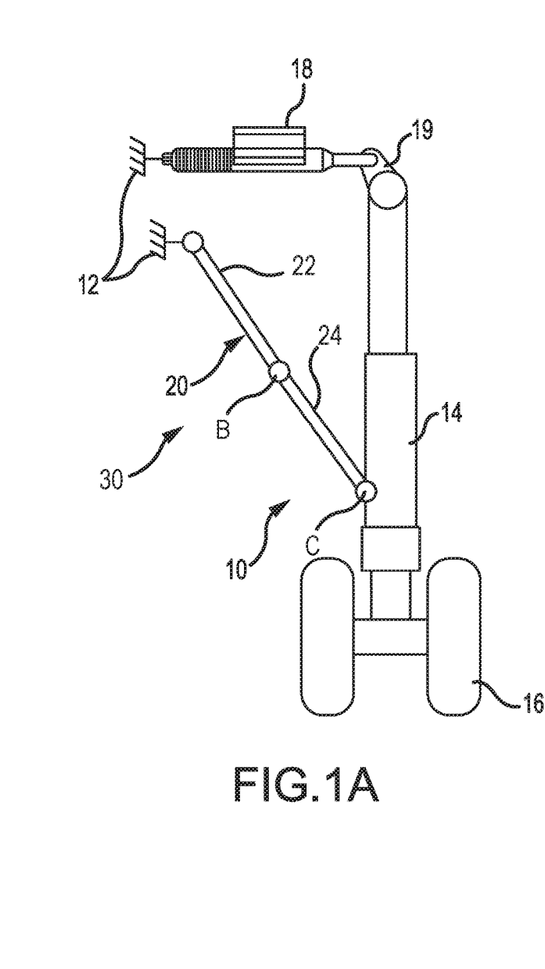
FIG. 1A illustrates a schematic view of a landing gear arrangement in a deployed position, in accordance with various embodiments.
Figure 1B:
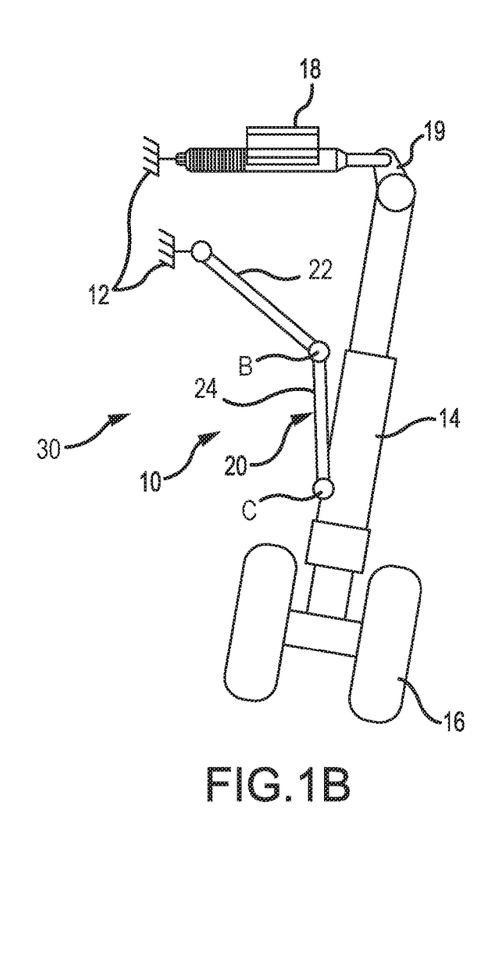
FIG. 1B illustrates a schematic view of a landing gear arrangement at an unlocked stage moving towards a stowed position, in accordance with various embodiments.

With initial reference to FIGS. 1A and 1B, a retraction sequence of a landing gear arrangement 10 is illustrated. In various embodiments, landing gear 10 includes a strut 14 supporting wheels 16. Strut 14 may be rotatable about a pivot, such as airframe 12, in response to an extend/retract actuator 18 applying a force to an arm 19. A brace linkage 20 may connect a lower portion of strut 14 to airframe 12, for example. In various embodiments, brace linkage 20 may comprise a side brace. In various embodiments, brace linkage 20 may comprise a drag brace. Brace linkage 20 may comprise a first brace link (also referred to herein as a first link) 22 and a second brace link (also referred to herein as a second link) 24. An actuator arrangement 30 may be interconnected between first link 22 and second link 24 to lock landing gear 10 in a deployed position until landing gear retraction is commanded, as will be explained with further detail herein. In this regard, an actuator arrangement 30 may be located about joint B.

In FIG. 1A, landing gear 10 is shown in the deployed position. The first link 22 and second link 24 are pivotally locked relative to each other at a joint B. One end of second link 24 may be connected to strut 14 at pivot C. The actuator arrangement 30, as described herein, may unlock in response to landing gear moving to the stowed position, as illustrated in FIG. 1B.

In various embodiments, although the illustrated embodiment illustrates strut 14 being rotatable in response to an extend/retract actuator 18 applying a force to an arm 19, it is contemplated herein that the actuator arrangement 30, as described herein, may be adapted to various configurations of landing gear 10 being deployable by various components and/or methods.

Figure 2A:
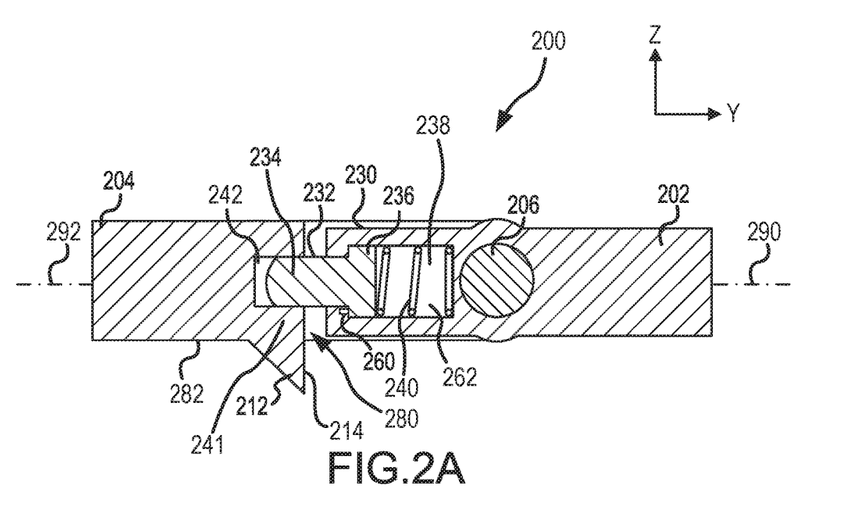
FIG. 2A illustrates a cross-sectional side view of an actuator arrangement in a locked position, in accordance with various embodiments.

With reference to FIG. 2A, an actuator arrangement 200 is illustrated in a locked position, in accordance with various embodiments. In various embodiments, actuator arrangement 200 may include a first brace link (also referred to herein as a first link) 202, a second brace link (also referred to herein as a second link) 204. Actuator arrangement 200 may comprise a pivot 206. First link 202 and/or second link 204 may rotate about pivot 206. In various embodiments, first link 202 may include an actuator housing 230. Actuator housing 230 may retain an actuator piston 232. Actuator piston 232 may comprise a piston head 236 and a piston rod 234 extending from piston head 236. Actuator housing 230 may define a retaining cavity 238. Piston head 236 may be located within retaining cavity 238. Actuator arrangement 200 may comprise a spring 240. Spring 240 may be disposed within actuator housing 230. Spring 240 may be disposed between actuator housing 230 and piston head 236. Spring 240 may bias actuator piston 232 to extend from actuator housing 230. In various embodiments, spring 240 may comprise a coil spring, a leaf spring, or any other suitable spring.

In various embodiments, an end 280 of second link 204 may comprise a receptacle body 241 defining a receiving cavity 242. Receiving cavity 242 may be configured to receive piston rod 234 in response to landing gear 10 being deployed, with momentary reference to FIG. 1A. In various embodiments, receiving cavity 242 may be axially in line with longitudinal axis 292. In various embodiments, receptacle body 241 and second link 204 may comprise a single unitary member (as shown in FIG. 2A). In various embodiments, receptacle body 241 may be coupled to second link 204 via one or more fasteners.

First link 202 may comprise a longitudinal axis 290. Second link 204 may comprise a longitudinal axis 292. Actuator arrangement 200 may be configured to move to the locked position in response to longitudinal axis 290 being parallel with longitudinal axis 292. In this regard, actuator piston 232 may be in line with longitudinal axis 290 and longitudinal axis 292 when actuator arrangement 200 is in the locked position. In various embodiments, actuator arrangement 200 may be configured to move to the locked position when longitudinal axis 290 and longitudinal axis 292 are at an angle relative to one another (e.g., over-center rigging). In this regard, actuator arrangement 200 may be configured to move to the locked position in response to longitudinal axis 290 being at an angle relative to longitudinal axis 292. In this regard, actuator arrangement 200 may be configured to move to the locked position in response to a pre-determined alignment of first link 202 and second link 204. Longitudinal axis 290 and longitudinal axis 292 may be parallel or may be at an angle relative to each other in the pre-determined alignment (or locked) position.

Figure 2B:
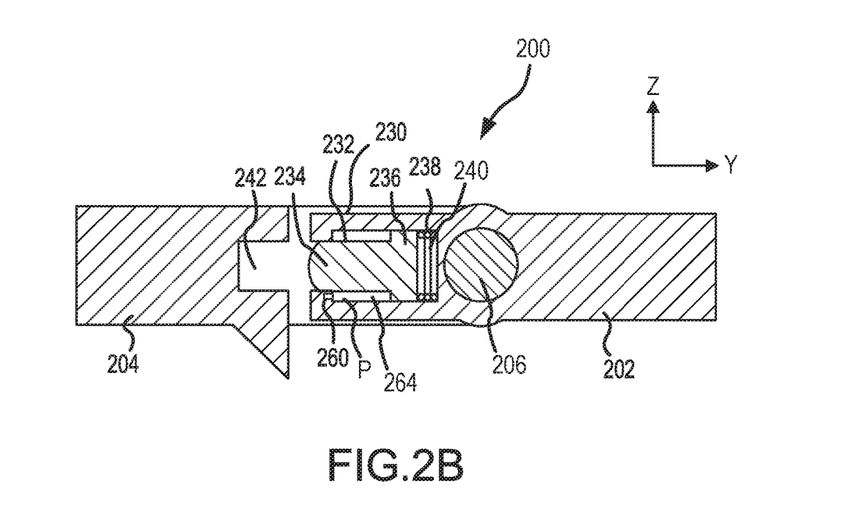
FIG. 2B illustrates a cross-sectional side view of the actuator arrangement in an unlocked position, in accordance with various embodiments.

A port 260 may be disposed in actuator housing 230. With reference to FIG. 2D, actuator arrangement 200 is illustrated in the unlocked position, in accordance with various embodiments. With combined reference to FIG. 2A and FIG. 2D, piston head 236 may separate retaining cavity 238 into a first chamber 262 and a second chamber 264 (as shown in FIG. 2B). Spring 240 may be located within first chamber 262. Hydraulic port 260 may be in fluid communication with second chamber 264. In various embodiments, hydraulic pressure P may be supplied to second chamber 264 via hydraulic port 260 to bias actuator piston 232, against the bias of spring 240, to retract actuator piston 232 into actuator housing 230. It is contemplated herein that seals may be provided within actuator housing 230 to prevent leakage of hydraulic pressure P, such as between actuator piston 232 and actuator housing 230 for example. First link 202 may rotate freely about pivot 206 relative to second link 204 in the unlocked position (as shown in FIG. 2B).

It is contemplated herein, that hydraulic pressure P may be supplied to first chamber 262 via hydraulic port 260 to bias actuator piston 232 to extend actuator piston 232 from actuator housing 230. In this regard, port 260 may be in fluid communication with first chamber 262, in accordance with various embodiments. In this regard, spring 240 may be disposed in second chamber 262, in accordance with various embodiments.

In various embodiments, first link 202 may comprise a cam feature 212. Cam feature 212 may comprise a sliding surface 214. Although illustrated as being linear, it is contemplated herein that sliding surface 214 may be curved or rounded. Cam feature 212 may comprise a projection on second link 204 designed to make sliding contact with piston rod 234 while second link 204 rotates from an unlocked position to the locked position to impart linear motion on actuator piston 232 and bias actuator piston 232 to retract into actuator housing 230. In this regard, cam feature 212 may provide a safety feature in the event that actuator piston 232 is not retracted into actuator housing 230 via hydraulic pressure from port 260, allowing first link 202 and second link 204 to move to the locked position. Stated differently, cam feature 212 may prevent an extended actuator rod 234 from contacting side 282 of second link 204 which may prevent first link 202 and second link 204 from rotating to a locked position (as shown in FIG. 2A).

With reference to FIG. 2B, a bottom view of actuator arrangement 200 is illustrated, in accordance with various embodiments. In various embodiments, actuator housing 230 may extend in the opposite direction (i.e., negative y-direction) from pivot 206 as first link 202.

Figure 2C:
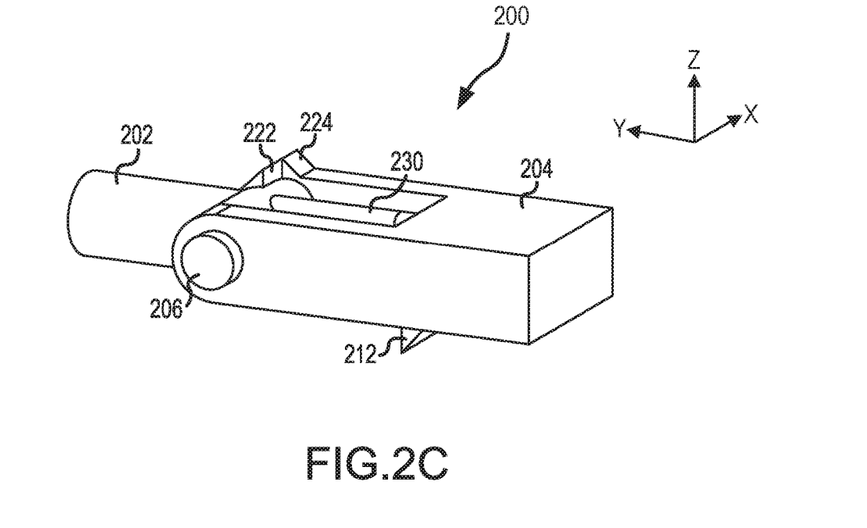
FIG. 2C illustrates a perspective view of the actuator arrangement in a locked position, in accordance with various embodiments.
Figure 2D:
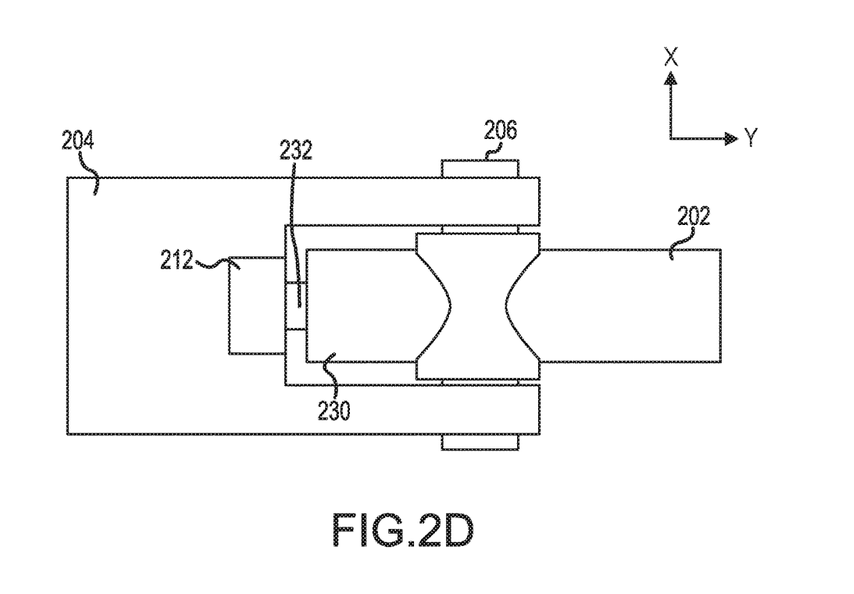
FIG. 2D illustrates bottom view of the actuator arrangement in the locked position, in accordance with various embodiments.

With reference to FIG. 2C, a perspective view of actuator arrangement 200 is illustrated in a locked position, in accordance with various embodiments. In various embodiments, first link 202 may comprise first stopping feature 222 and second link 204 may comprise a second stopping feature 224. First stopping feature 222 may comprise a protrusion from first link 202. Second stopping feature 224 may comprise a protrusion from second link 204. First stopping feature 222 and second stopping feature 224 may prevent over rotation of first link 202 and/or second link 204. First stopping feature 222 and second stopping feature 224 may provide an over-center stop. In various embodiments, shims may be provided between first stopping feature 222 and second stopping feature 224 for adjustment of the point of rotation at which first stopping feature 222 and second stopping feature 224 prevent rotational movement of first link 202 and second link 204.

In various embodiments, actuator housing 230 and first link 202 may comprise a single, unitary member. However, actuator housing 230 and first link 202 may comprise two separate members. For example, actuator housing 230 may be coupled to first link 202 via a plurality of fasteners.

It is contemplated herein that actuator housing 230 and receptacle body 241 of the exemplary embodiments provided herein, as shown in FIG. 2A through FIG. 2D, may be reversed. In this regard, actuator housing 230 may be coupled to second link 204 and receptacle body 241 may be coupled to first link 202. In various embodiments, when actuator housing 230 is coupled to first link 202, first link 202 is referred to herein as a housing link and second link 204 is referred to as a receiving link. In various embodiments, when actuator housing 230 is coupled to second link 204, second link 204 is referred to herein as a housing link and first link 202 is referred to as a receiving link.

In various embodiments, actuator housing 230, first link 202, second link 204, and/or actuator piston 232 may be made of a steel alloy (for example, 300M low alloy steel, such as SAE AMS6417 specification), or a titanium alloy (for example, Ti-10-2-3, such as SAE AMS4983 specification), or aluminum or an alloy thereof. Actuator housing 230, first link 202, second link 204, and/or actuator piston 232 may be coated with one or more coatings to prevent corrosion or otherwise improve mechanical properties and/or service life.

Figure 3A:
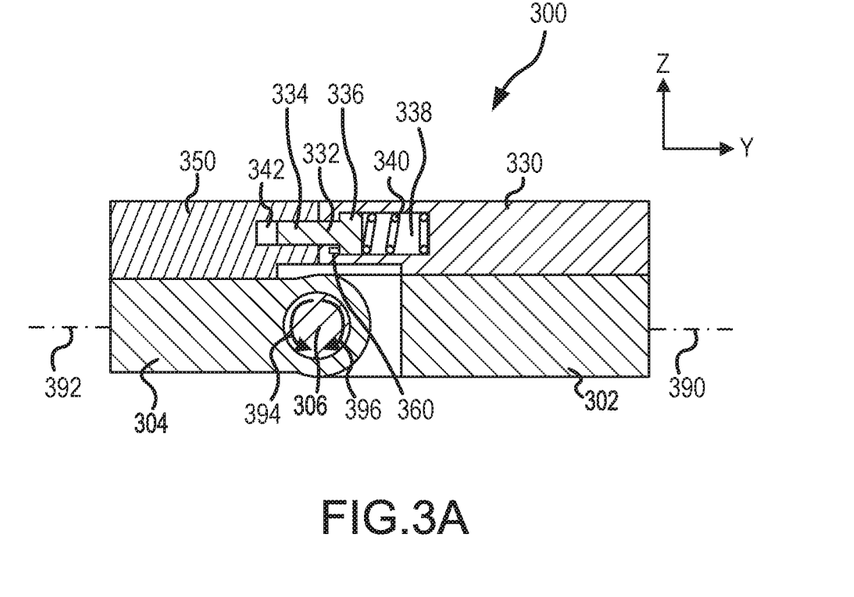
FIG. 3A illustrates a cross-sectional side view of an actuator arrangement in a locked position, in accordance with various embodiments.
Figure 3B:
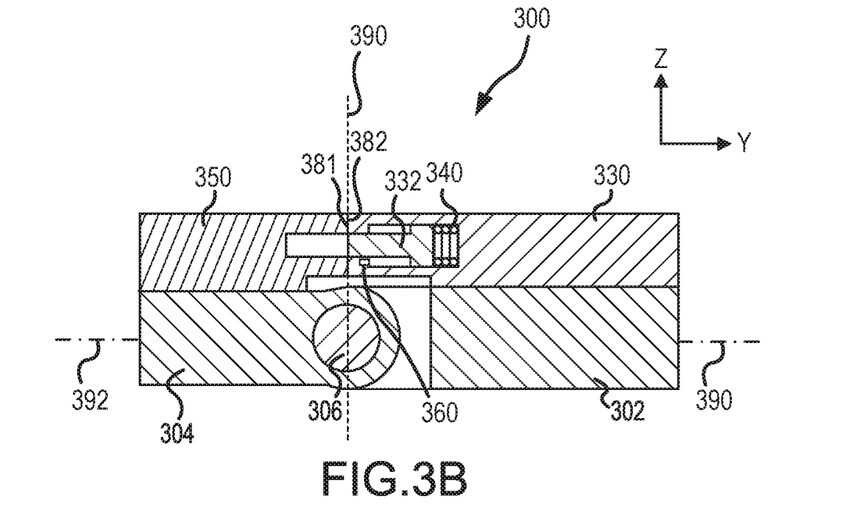
FIG. 3B illustrates a cross-sectional side view of the actuator arrangement in an unlocked position, in accordance with various embodiments.

With combined reference to FIG. 3A and FIG. 3B, an actuator arrangement 300 is illustrated in a locked position and an unlocked position, respectively, in accordance with various embodiments. In various embodiments, actuator arrangement 300 may be similar to actuator arrangement 200, with momentary reference to FIG. 2A. Actuator arrangement 300 may comprise an actuator housing 330, a receptacle body 350, and an actuator piston 332. Actuator arrangement 300 may comprise first link 302 and second link 304. Actuator housing 330 and receptacle body 350 may be mounted to first link 302 and second link 304, respectively, offset (in the z-direction) from longitudinal axes 390, 392. In this regard, actuator housing 330 may comprise a stopping surface 381 and receptacle body 350 may comprise a stopping surface 382. Stopping surface 381 may engage stopping surface 382 to prevent over rotating of first link 302 and second link 304. Stopping surface 381 and stopping surface 382 may be located in a plane 390 which is perpendicular to longitudinal axis 390 and which bisects pivot 306 when longitudinal axis 392 and longitudinal axis 390 are parallel. However, stopping surface 381 and stopping surface 382 may be located in a plane which is at an angle relative to longitudinal axis 390 and/or longitudinal axis 392, such as for an over-center rigging for example.

In various embodiments, stopping surface 381 and stopping surface 382 may prevent first link 302 from rotating about pivot 306 in a first rotational direction 394. Actuator piston 332 may prevent first link 302 from rotating about pivot 306 in a second rotational direction 396.

Actuator housing 330 may retain actuator piston 332. Actuator piston 332 may be similar to actuator piston 232 (see FIG. 2A and FIG. 2B). Actuator piston 332 may comprise a piston head 336 and a piston rod 334 extending from piston head 336. Actuator housing 330 may define a retaining cavity 338. Retaining cavity 338 may be similar to retaining cavity 238 (see FIG. 2A and FIG. 2B). Piston head 336 may be located within retaining cavity 338. Actuator arrangement 300 may comprise a spring 340. Spring 340 may be disposed within actuator housing 330. Spring 340 may be disposed between actuator housing 330 and piston head 336. Spring 340 may bias actuator piston 332 to extend from actuator housing 330. In various embodiments, spring 340 may comprise a coil spring, a leaf spring, or any other suitable spring.

A port 360 may be disposed in actuator housing 330. Port 360 may be similar to port 260 (see FIG. 2A and FIG. 2B).

Figure 3C:
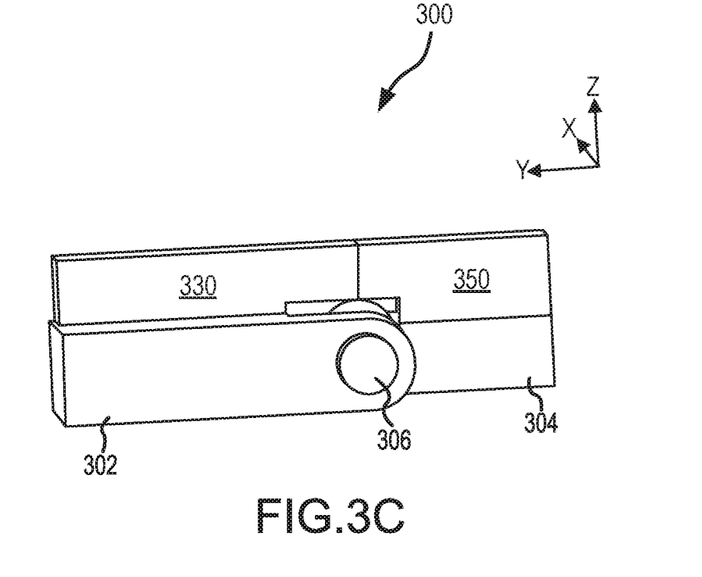
FIG. 3C illustrates a perspective view of the actuator arrangement, in accordance with various embodiments.
Figure 3D:
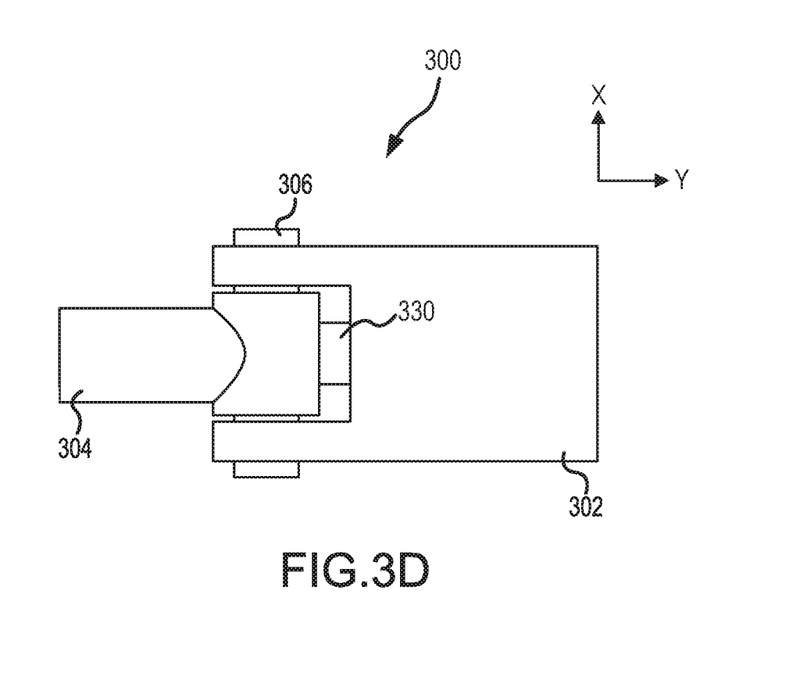
FIG. 3D illustrates bottom view of the actuator arrangement in the locked position, in accordance with various embodiments.

With combined reference to FIG. 3C and FIG. 3D, a perspective view and a bottom view, respectively, of actuator arrangement 300 is illustrated, in accordance with various embodiments.

In various embodiments, actuator housing 330, receptacle body 350, first link 302, second link 304, and/or actuator piston 332 may be made of a steel alloy (for example, 300M low alloy steel, such as SAE AMS6417 specification), or a titanium alloy (for example, Ti-10-2-3, such as SAE AMS4983 specification), or aluminum or an alloy thereof. Actuator housing 330, receptacle body 350, first link 302, second link 304, and/or actuator piston 332 may be coated with one or more coatings to prevent corrosion or otherwise improve mechanical properties and/or service life.

It is contemplated herein that actuator housing 330 and receptacle body 350 of the exemplary embodiments provided herein, as shown in FIG. 3A through FIG. 3D, may be reversed. In this regard, actuator housing 330 may be coupled to second link 304 and receptacle body 350 may be coupled to first link 302. In various embodiments, when actuator housing 330 is coupled to first link 302, first link 302 is referred to herein as a housing link and second link 304 is referred to as a receiving link. In various embodiments, when actuator housing 330 is coupled to second link 304, second link 304 is referred to herein as a housing link and first link 302 is referred to as a receiving link.

Figure 4:
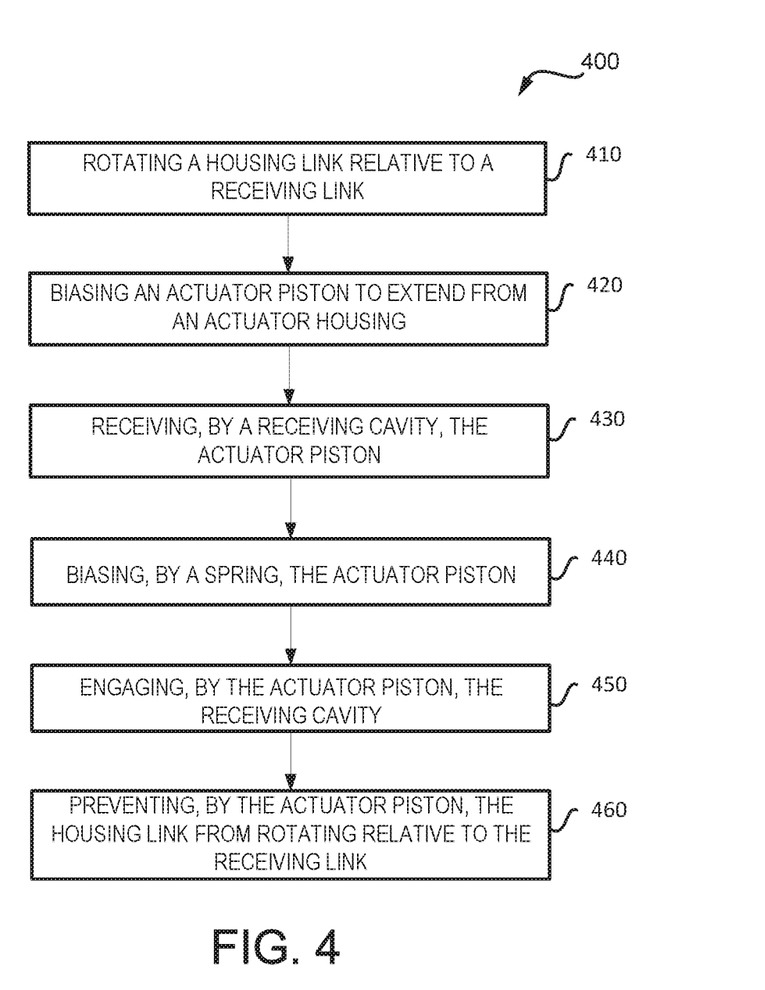
FIG. 4 provides a method for locking coupled links from rotation to maintain a landing gear arrangement in a deployed position, in accordance with various embodiments.

With reference to FIG. 4, a method 400 for locking coupled links from rotation is provided, in accordance with various embodiments. In various embodiments, method 400 may include rotating a housing link relative to a receiving link (step 410). Method 400 includes biasing an actuator piston to extend from an actuator housing (step 420). Method 400 includes receiving, by a receiving cavity, the actuator piston (step 430). Method 400 may include biasing, by a spring, the actuator piston (step 440). Method 400 includes engaging, by the actuator piston, the receiving cavity (step 450). Method 400 includes preventing, by the actuator piston, the housing link from rotating relative to the receiving link (step 460).

With combined reference to FIG. 2A and FIG. 4, step 410 may include rotating first link 202 relative to second link 204. This rotation may be in response to landing gear 10 being deployed, with momentary reference to FIG. 1A. Step 420 may include biasing actuator piston 232 to extend from actuator housing 230 coupled to first link 202. Step 430 may include receiving, by receiving cavity 242, actuator piston 232. Step 440 may include biasing, by spring 240, actuator piston 232. Step 450 may include engaging, by actuator piston 232, receiving cavity 242. Stated differently, actuator piston 232 may engage second link 204. Step 460 may include preventing, by actuator piston 232, first link 202 from rotating relative to second link 204, in response to the engaging.

With combined reference to FIG. 3A and FIG. 4, step 410 may include rotating first link 302 relative to second link 304. This rotation may be in response to landing gear 10 being deployed, with momentary reference to FIG. 1A. Step 420 may include biasing actuator piston 332 to extend from actuator housing 330 coupled to first link 302. Step 430 may include receiving, by receiving cavity 342, actuator piston 332. Step 440 may include biasing, by spring 340, actuator piston 332. Step 450 may include engaging, by actuator piston 332, receiving cavity 342. Stated differently, actuator piston 332 may engage receptacle body 350. Step 460 may include preventing, by actuator piston 332, first link 302 from rotating relative to second link 304, in response to the engaging.

Figure 5:
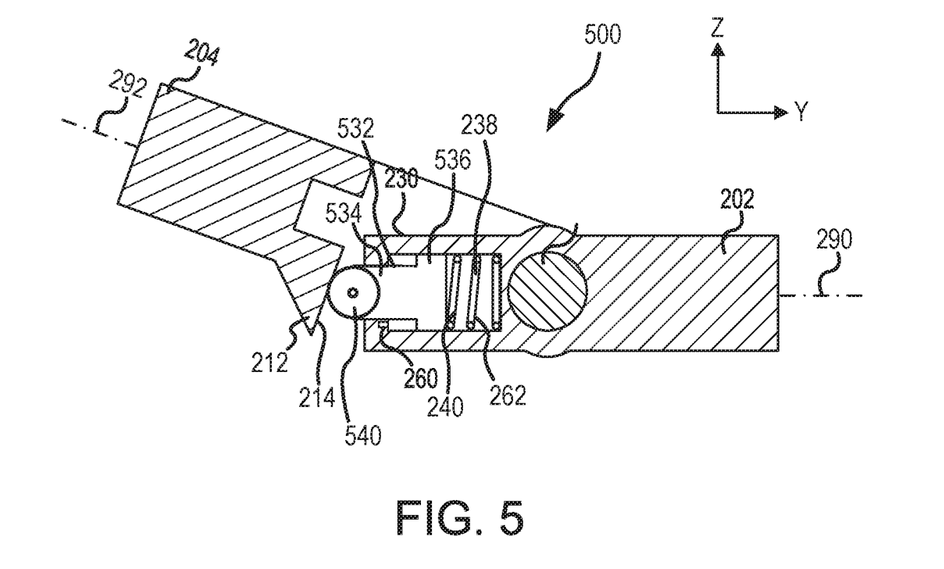
FIG. 5 illustrates a cross-sectional side view of the actuator arrangement in an unlocked position and moving towards a locked position with an actuator piston in a partially extended position and having a wheel engaging a surface of a cam feature, in accordance with various embodiments.

With respect to FIG. 5, elements with like element numbering, as depicted in FIG. 2A through FIG. 2D, are intended to be the same and will not necessarily be repeated for the sake of clarity.

With reference to FIG. 5, an actuator arrangement 500 is illustrated in an unlocked position moving towards a locked position, in accordance with various embodiments. Actuator arrangement 500 may be similar to actuator arrangement 200, with momentary reference to FIG. 2A. Actuator arrangement 200 may include actuator piston 532. In various embodiments, actuator piston 532 may be similar to actuator piston 232, with momentary reference to FIG. 2A. Actuator housing 230 may retain an actuator piston 532. Actuator piston 532 may comprise a piston head 536 and a piston rod 534 extending from piston head 536. Actuator piston 532 may comprise a wheel 540 coupled to an end of piston rod 534. Wheel 540 may facilitate motion of actuator piston 532 along sliding surface 214 of cam feature 212. In this regard, wheel 540 may roll along sliding surface 214 of cam feature 212.

Figure 6:
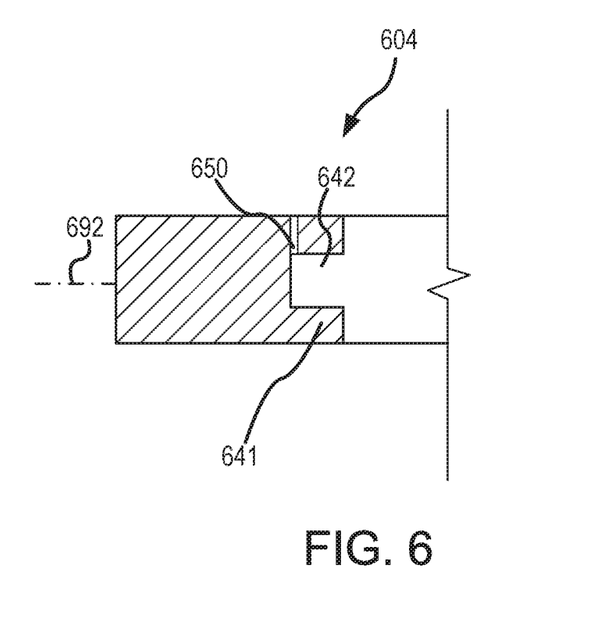
FIG. 6 illustrates a cross-sectional side view of a receiving link with a drain aperture for providing drainage to a receiving cavity, in accordance with various embodiments.

With reference to FIG. 6, a second link 604 is illustrated, in accordance with various embodiments. in various embodiments, second link 604 may be similar to second link 204, with momentary reference to FIG. 2A. Second link 604 may comprise a receptacle body 641 defining a receiving cavity 642. A drain aperture 650 may be disposed in receptacle body 641 to provide a drainage for receiving cavity 642. In various embodiments, drain aperture 650 may prevent receiving cavity 642 from filling with a fluid or solid, such as ice for example. Although illustrated as being perpendicular to longitudinal axis 692, it is contemplated herein that drain aperture 650 may be oriented in any direction. For example, drain aperture 650 may extend from receiving cavity parallel to longitudinal axis 692.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A locking actuator arrangement for a landing gear comprising:
   a housing link extending from a pivot in a first direction and extending along a first longitudinal axis;
   an actuator housing extending from the pivot in a second direction, the second direction is opposite the first direction, the actuator housing defining a retaining cavity;
   a receiving link pivotally coupled to the housing link and defining a receiving cavity, the receiving link comprises a second longitudinal axis; and
   an actuator piston comprising a piston head and a piston rod extending from the piston head;
   wherein the receiving cavity is configured to receive at least a portion of the piston rod, and
   the piston rod is configured to be received by the receiving cavity in response to a pre-determined alignment of the housing link and the receiving link.

2. The locking actuator arrangement of claim 1, further comprising a spring configured to be disposed in the retaining cavity, wherein the spring is configured to bias the actuator piston to at least one of extend from and retract into the retaining cavity.

3. The locking actuator arrangement of claim 2, wherein the piston head is configured to separate the retaining cavity into a first chamber and a second chamber.

4. The locking actuator arrangement of claim 3, further comprising a port in fluid communication with the retaining cavity configured to supply a hydraulic pressure to at least one of retract and extend the actuator piston relative to the actuator housing.

5. The locking actuator arrangement of claim 4, wherein the spring is housed within the first chamber.

6. The locking actuator arrangement of claim 2, further comprising:
   a first stopping feature disposed on the housing link; and
   a second stopping feature disposed on the receiving link,
      wherein the first stopping feature is configured to engage the second stopping feature to prevent over rotation of at least one of the housing link and the receiving link.

7. The locking actuator arrangement of claim 2, further comprising a cam feature disposed on the receiving link configured to make sliding contact with the piston rod.

8. A landing gear arrangement, comprising:
   a housing link comprising a first longitudinal axis;
   a receiving link pivotally coupled to the housing link, the receiving link comprises a second longitudinal axis;
   an actuator housing coupled to the housing link and defining a retaining cavity; and
   an actuator piston comprising a piston head and a piston rod extending from the piston head, the actuator piston moves along a third longitudinal axis, wherein the third longitudinal axis is offset from the first longitudinal axis,
   wherein the receiving link defines a receiving cavity, and the piston rod is configured to be received by the receiving cavity in response to the landing gear arrangement being deployed.

9. The landing gear arrangement of claim 8, further comprising a spring configured to bias the actuator piston to at least one of extend from and retract into the retaining cavity.

10. The landing gear arrangement of claim 9, wherein the actuator housing extends from the housing link.

11. The landing gear arrangement of claim 10, further comprising a pivot, wherein the housing link is pivotally coupled to the receiving link via the pivot.

12. The landing gear arrangement of claim 11, wherein the piston head is configured to separate the retaining cavity into a first chamber and a second chamber.

13. The landing gear arrangement of claim 12, further comprising a port in fluid communication with the retaining cavity configured to supply a hydraulic pressure to at least one of retract and extend the actuator piston relative to the actuator housing.

14. The landing gear arrangement of claim 13, wherein the spring is housed within the first chamber.

15. The landing gear arrangement of claim 8, further comprising:
   a first stopping feature disposed on the housing link; and
   a second stopping feature disposed on the receiving link,
      wherein the first stopping feature is configured to engage the second stopping feature to prevent over rotation of at least one of the housing link and the receiving link.

16. The landing gear arrangement of claim 8, further comprising a cam feature disposed on the receiving link configured to make sliding contact with the piston rod.

17. A method for a locking actuator arrangement for a landing gear comprising:

biasing an actuator piston to extend from an actuator housing coupled to a housing link;
receiving, by a receiving cavity, the actuator piston;
engaging, by the actuator piston, the receiving cavity; and
preventing, by the actuator piston, the housing link from rotating relative to a receiving link, in response to the engaging,
wherein the housing link extends from a pivot in a first direction and extends along a first longitudinal axis;
the actuator housing extends from the pivot in a second direction, the second direction is opposite the first direction, the actuator housing defines a retaining cavity;
the receiving link is pivotally coupled to the housing link, the receiving link defines the receiving cavity, the receiving link comprises a second longitudinal axis;
the actuator piston comprises a piston head and a piston rod extending from the piston head;
the receiving cavity is configured to receive at least a portion of the piston rod, and
the piston rod is configured to be received by the receiving cavity.

18. The method of claim 17, further comprising:
rotating the housing link relative to the receiving link; and
biasing, by a spring, the actuator piston.

\* \* \* \* \*